United States Patent
Muller et al.

(10) Patent No.: US 8,219,626 B2
(45) Date of Patent: *Jul. 10, 2012

(54) BODY-LESS EMAIL FOR ASYNCHRONOUS CHAT-LIKE COMMUNICATIONS AND EMAIL-CHAT INTEGRATION

(75) Inventors: Michael J. Muller, Medford, MA (US); Sara Beth Weber, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/715,547

(22) Filed: Mar. 2, 2010

(65) Prior Publication Data
US 2010/0161749 A1    Jun. 24, 2010

Related U.S. Application Data

(63) Continuation of application No. 10/734,920, filed on Dec. 12, 2003, now Pat. No. 7,698,368.

(51) Int. Cl.
*G06F 15/16* (2006.01)
(52) U.S. Cl. ............... 709/206; 709/203; 709/246
(58) Field of Classification Search .......... 709/204–206, 709/246
See application file for complete search history.

(56) References Cited

U.S. PATENT DOCUMENTS

| | | | | |
|---|---|---|---|---|
| 7,461,378 B2 * | 12/2008 | Beyda | | 719/313 |
| 2004/0064586 A1 * | 4/2004 | Weigand | | 709/246 |
| 2004/0078446 A1 * | 4/2004 | Daniell et al. | | 709/206 |
| 2004/0078448 A1 * | 4/2004 | Malik et al. | | 709/206 |
| 2004/0158611 A1 * | 8/2004 | Daniell et al. | | 709/206 |
| 2004/0199598 A1 * | 10/2004 | Kalfas | | 709/207 |
| 2004/0215721 A1 * | 10/2004 | Szeto et al. | | 709/204 |
| 2007/0130271 A1 * | 6/2007 | Ye et al. | | 709/206 |

OTHER PUBLICATIONS

P. Resnick, Request for Comments: 2822, pp. 1-51, Apr. 2001.*

* cited by examiner

*Primary Examiner* — Joshua Joo
(74) *Attorney, Agent, or Firm* — Guerin & Rodriguez, LLP; Michael A. Rodriguez

(57) ABSTRACT

A system and method integrate synchronous electronic (e.g., chat) communications with asynchronous electronic communications in the form of body-less electronic mail messages (emails). Body-less emails have a subject line but lack a message body capable of receiving message content. When converting a synchronous electronic communication into a body-less email, a processor places each text message of the synchronous electronic communication into the subject line of the body-less email. When converting a received body-less email into a synchronous electronic communication, the processor places each text message in the subject line of the body-less email into a chat format. A user can readily transition between asynchronous and synchronous communications.

20 Claims, 6 Drawing Sheets

| Inbox | | | | |
|---|---|---|---|---|
| Sender | Date | | Subject | Size |
| Kumiyo Kagani | 11/16/2003 | <> | RE: Do not go gentle into the good night. | 3 |
| Glen Keats | 11/16/2003 | | RE: Addressed to Hayden | 4 |
| Nick Kipling | 11/16/2003 | | If you can keep your head when all about | 2 |
| Jesus Fernandez | 11/16/2003 | | The intellect of man is forced to choose pe | 2 |
| Rhonda Morgan | 11/15/2003 | | RE: Can anyone recommend good poetry? | 2 |
| Thabo Mandela | 11/15/2003 | <> | Addressed to Hayden | 3 |
| Virgil Hall | 11/15/2003 | | Can anyone recommend good poetry? | 2 |
| Rita Teasdake | 11/15/2003 | <> | I've set up the meeting for Tuesday at 10AM. Let me know if this is acceptable. <m> | 2 |
| Glen Keats | 11/15/2003 | | RE: Any time Tuesday or Wednesday. –S. | 1 |
| Sally Whitefeather | 11/14/2003 | <> | RE: How about next week? <m> RE: If you are talking about this week, then Thursday at 2 PM is my only possibility. – S. RE: I am attempting to schedule a meeting to discuss the status of the project. Please send me your availability. Thanks, <m> | 2 |

*FIG. 4*

| Inbox | | | |  ☐ ☒ |
|---|---|---|---|---|
| Sender | Date | | Subject | Size |
| Kumiyo Kagani | 11/16/2003 | ◇ | RE: Do not go gentle into the good night. | 3 |
| Glen Keats | 11/16/2003 | ◇ | RE: Addressed to Hayden | 4 |
| Nick Kipling | 11/16/2003 | | If you can keep your head when all about | 2 |
| Jesus Fernandez | 11/16/2003 | | The intellect of man is forced to choose pe | 2 |
| Rhonda Morgan | 11/15/2003 | | RE: Can anyone recommend good poetry? | 2 |
| Thabo Mandela | 11/15/2003 | ◇ | Addressed to Hayden | 3 |
| Virgil Hall | 11/15/2003 | | Can anyone recommend good poetry? | 2 |
| Rita Teasdake | 11/15/2003 | ◇ | ■ I've set up the meeting for Tuesday at 10AM ▲ | 2 |
| Glen Keats | 11/15/2003 | | When I behold, on the night's starred face | 1 |
| Sally Whitefeather | 11/14/2003 | | Do not go gentle into the good night. | 2 |

FIG. 5

BODY-LESS EMAIL FOR ASYNCHRONOUS CHAT-LIKE COMMUNICATIONS AND EMAIL-CHAT INTEGRATION

RELATED APPLICATION

This application is a continuation application claiming the benefit of co-pending U.S. patent application Ser. No. 10/734,920, filed Dec. 12, 2003, titled "Body-less email for asynchronous chat-like communications and email-chat integration", the entirety of which U.S. patent application, is incorporated by reference herein.

FIELD OF THE INVENTION

The invention relates generally to electronic mail and chat systems. More particularly, the invention relates to an electronic mail system and method for communicating chat-like electronic mail messages.

BACKGROUND

Electronic mail or email and chat are widespread software tools for communicating among computer users. Email enables users to communicate asynchronously, whereas chat communication occurs synchronously. On occasion, users are unable to engage in synchronous chat because one of the parties is not online or his computer system lacks chat capability. In such situations, the users may resort to email to conduct a chat-like conversation. When using email to conduct a chat, a user may type his brief message into the subject header, because chat messages are characteristically brief, leaving the body of the email message empty. Transmitting email messages without content, however, wastes bandwidth. Further, chats typically involve a series of many brief messages, which, when conducted with email messages, only increases the amount of bandwidth needed to carry email traffic with no content. Email messages also tend to remain for considerable periods in a user's mailbox, thus occupying local computer and server memory for what is, in effect, blank content. There is, therefore, a need for a system and method that can use email for chat-like communications can without the aforementioned disadvantages.

SUMMARY

In one aspect, the invention features a computer program product for communicating with a user of a processor-based device over a network. The computer program product comprises a computer readable storage medium having computer readable program code embodied therewith. The computer readable program code comprises computer readable program code configured to convert a synchronous electronic communication into a body-less electronic mail message having a subject line and lacking a message body capable of receiving message content; and computer readable program code configured to place, in response to converting the synchronous electronic communication into a body-less electronic mail message, at least one text message transmitted as part of the synchronous communication into the subject line of the body-less electronic mail message.

In another aspect, the invention features a computer program product for communicating with a user of a processor-based device over a network. The computer program product comprises a computer readable storage medium having computer readable program code embodied therewith. The computer readable program code comprises computer readable program code configured to convert a received synchronous electronic communication into a body-less electronic mail message having a subject line and lacking a message body capable of receiving message content; and computer readable program code configured to place each text message of the received synchronous electronic communication into the subject line of the body-less electronic mail message when converting the received synchronous electronic communication into the body-less electronic mail message; and computer readable program code configured to convert a received bodyless electronic mail message into a synchronous electronic communication.

In yet another aspect, the invention features a computing system comprising a processor executing computer readable program code configured to convert a synchronous electronic communication into a body-less electronic mail message having a subject line and lacking a message body capable of receiving message content. The processor places, in response to converting the synchronous electronic communication into the body-less electronic mail message, at least one text message transmitted as part of the synchronous communication into the subject line of the body-less electronic mail message.

In still another aspect, the invention features a method of communicating with a user of a processor-based device over a network. The method comprises converting a synchronous communication into a body-less electronic mail message having a subject line and lacking a message body capable of receiving message content, and placing, in response to converting the synchronous communication, at least one text message transmitted as part of the synchronous communication into the subject line of the body-less electronic mail message.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 4 is a diagram of example of a display of a mailbox having a plurality of email messages including an mChat message, the entirety of the contents of the mChat message being displayed in a drop-down list.

FIG. 5 is a diagram of an example of a display of a mailbox having a plurality of email messages including an mChat message, the contents of the mChat message being partially displayed in a scrollable bar.

DETAILED DESCRIPTION

Users of computer systems or processor-based devices connected to a wired or wireless network can communicate with each other through chat-like electronic mail messages of the present invention, hereafter referred to as mail-chat or mChat messages. An integration of electronic mail (email)

and chat, the present invention features techniques for translating between mChat and chat formats to enable users to switch between asynchronous and synchronous communication as their circumstances require. Thus, colleagues can benefit from the advantages of chat (i.e., informal, terse statements within the context of previous communications) in an asynchronous and persistent format provided by email. MChat messages generally reduce the communications bandwidth needed to transmit an email message over a network and the memory needed to store an email message on email server systems, local client computer systems, and hand-held devices (e.g., cell phones, personal digital assistants or PDAs).

Figure 1:
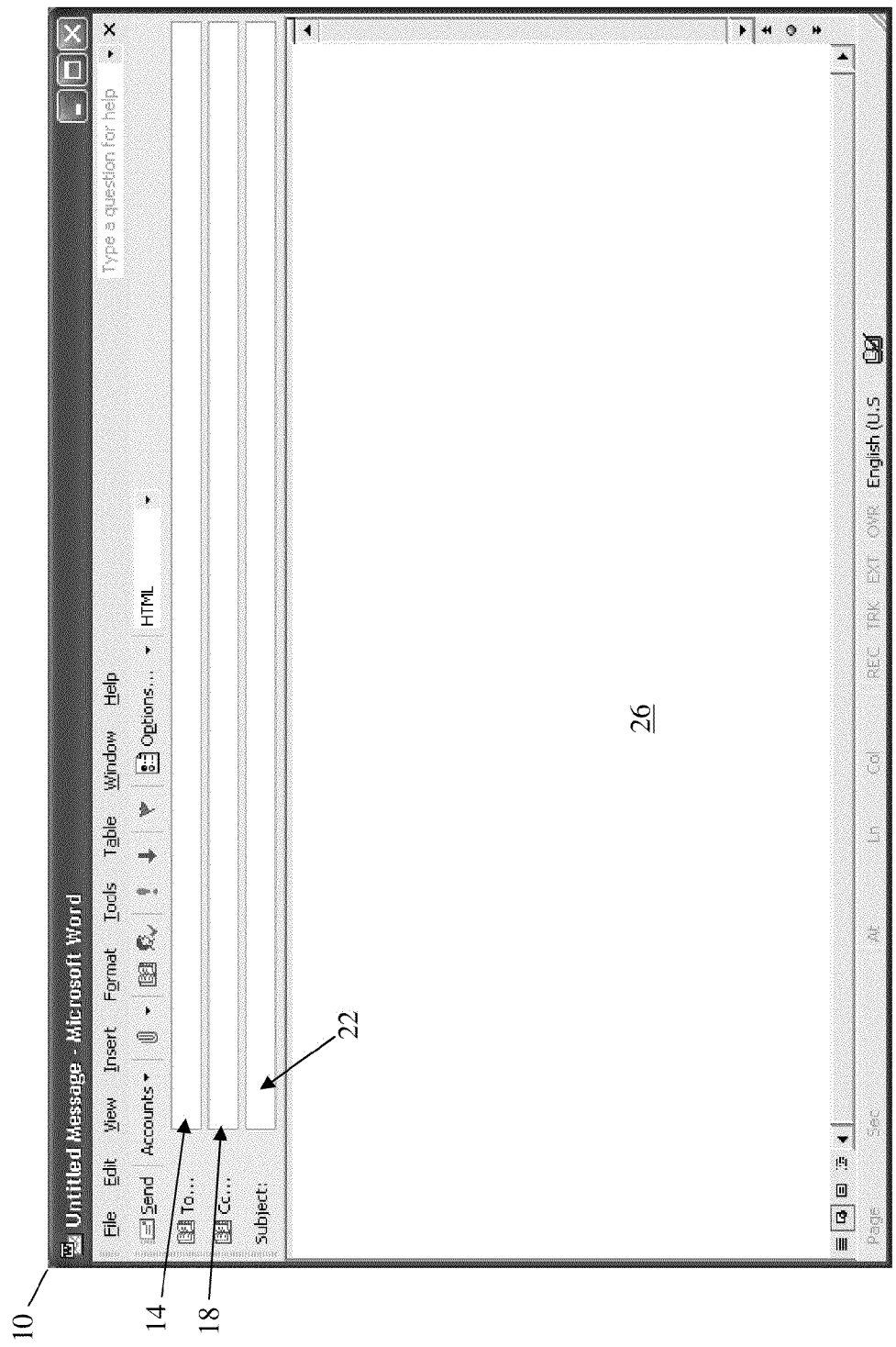
FIG. 1 is a diagram of a prior art electronic mail message having a message body.
Figure 2:
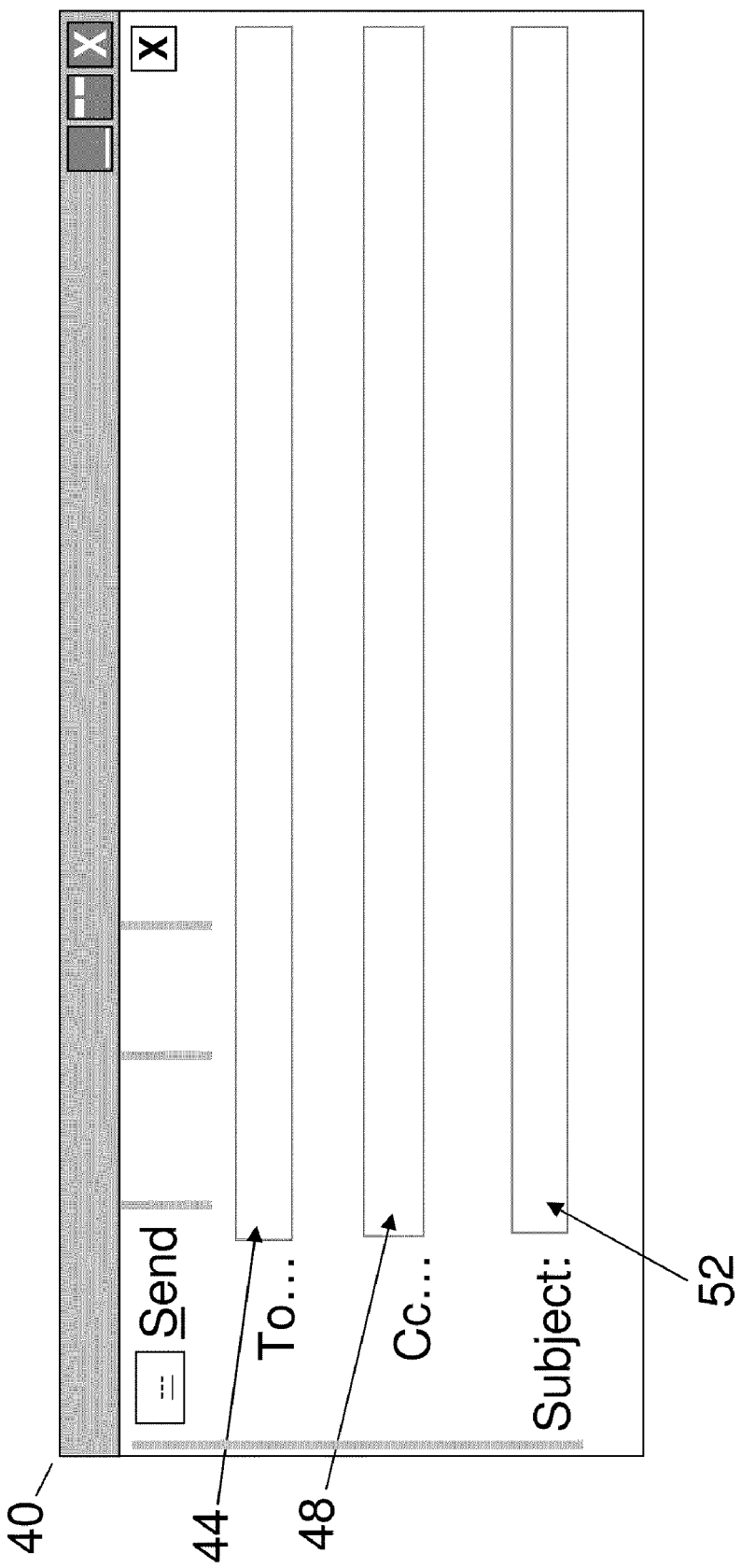
FIG. 2 is a diagram of a body-less electronic mail message of the present invention.

FIG. 1 shows a view of an example of a prior art email message 10 having a "To" line 14, a "Cc" line 18, a "Subject:" line 22, and a message body 26, as presented to a user who is writing a message. In contrast, FIG. 2 shows a view of an embodiment of an mChat message 40 of the invention. The mChat message 40 includes a "To" line 44, an optional "Cc" line 48, and a "Subject" line 52. Unlike the prior art email message 10 of FIG. 1, the mChat message 40 lacks a message body and is referred to as "body-less" email message. Other terms for referring to mChat messages include "header-only" and "subject-line-only" email messages. In one embodiment, the mChat contains only the email header (including the subject line). This embodiment achieves optimal economies in message transmission and storage. In another embodiment, the mChat message 40 can carry attachments and support other text lines such as a "Bcc" line, in the same manner as conventional email. This richer embodiment preserves the chat-like message format and the inter-translatability to chat, and also allows the mChat to carry additional data or attachments for user tasks.

Figure 3:
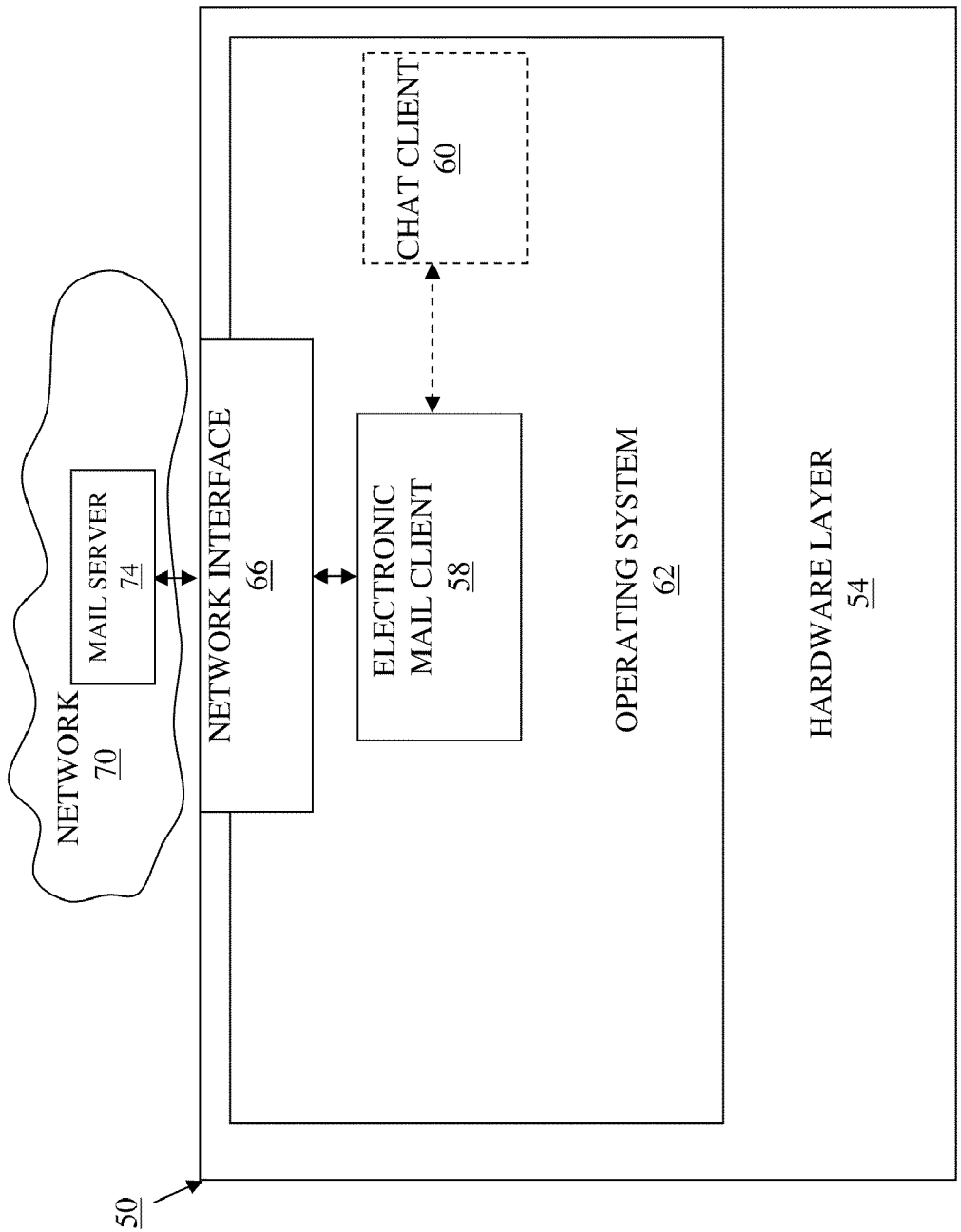
FIG. 3 is a block diagram of an embodiment of an electronic mail system constructed in accordance with the principles of the invention.

FIG. 3 shows an embodiment of a client system 50 constructed in accordance with the invention. The client system 50 can be any personal computer (e.g., 286, 386, 486, Pentium, Pentium II, Macintosh computer), Windows-based terminal, Network Computer, wireless device, information appliance, RISC Power PC, X-device, workstation, minicomputer, mainframe computer, cell phone, online gaming device such as Microsoft's XBOX™ or Sony's PLAYSTATION™, and personal digital assistant (PDA) or other computing device that has hardware 54 such as a display screen, one or more input devices (e.g., keypad, stylus, keyboard, mouse, touch-pad, and trackball), and a processor for executing application programs and sufficient persistent storage for storing such application programs and related information. One such application program is an electronic mail client program 58 of the invention.

The email client program 58 can be any proprietary email client program or any commercially available email client program, such as Lotus NOTES™ and Microsoft OUTLOOK™, modified to support mChat messaging of the invention. Embodiments of email programs constructed in accordance with the invention support mChat types of messages alone or in combination with conventional email messages. Optionally, another application program run by the client system 50 is a chat client program 60 (shown in phantom), which enables the user of the client system 50 to engage in synchronous communications with another chat user over the network 70. As described in connection with FIG. 6, either program 58, 60 can launch the other when users desire to transition between asynchronous and synchronous communications. The email client program 58 and optional chat client program 60 run on an operating system 62. Examples of operating systems supported by the client system 50 include Windows 3.x, Windows 95, Windows 98, Windows NT 3.51, Windows NT 4.0, Windows XP, Windows CE, Macintosh, Java, LINUX, and UNIX.

The client system 50 also includes a network interface 66 for communicating over a network 70. The network 70 can be a local-area network (LAN), a metro-area network (MAN), or wide-area network (WAN), such as the Internet or World Wide Web. Users of the client system 50 can connect to the network 70 through one of a variety of connections, such as standard telephone lines, LAN or WAN links (e.g., T1, T3), broadband connections (Frame Relay, ATM), and wireless connections (e.g., 802.11(a), 802.11(b), 802.11(g)). The email client program 58 communicates with an email server 74 located on the network 70. Users of the client system 50 initiate and participate in chat-like electronic conversations using mChat messages over the network 70 with other users of mChat-enabled computing systems.

To generate a first mChat message of a mChat conversation, a user launches the email client program 58 on the local computing system 50. When the user indicates to the email client program 58 an intention to generate a new mChat message, the email client program 58 displays by default an mChat message (similar to the mChat message 14 of FIG. 2) or presents a menu to the user in which an mChat message is a selectable item. The user enters the email address of each recipient into the To and Cc lines, 44, 48, types his message into the Subject line 52, and sends the mChat message towards its destination. Because the mChat message 14 lacks a message body, it requires less bandwidth to be transmitted over the network 70.

A recipient of the mChat message 14 can perpetuate the mChat conversation by responding. The recipient initiates a response by selecting a reply (e.g., to the sender only or to all recipients listed) or a forward operation presented by the mChat-enabled email program operating on the recipient's computing system. The mChat-enabled email client program recognizes that the type of email message being responded to is an mChat message, and, thus, produces a new mChat message in kind. Optionally, the recipient can choose to respond with a conventional email message instead of with an mChat message.

When first presented to the user generating the response, this new mChat message automatically includes the previous text message of the sender (located in the Subject line of that mChat message) within the Subject line of the new mChat message. At the beginning of the Subject line, the user adds her message, preferably leaving the text message of the sender in the Subject line after her message so that the entirety of the mChat conversation is in the Subject line. One embodiment permits the previous text message to be deleted, another embodiment does not.

Although individual chat messages are typically brief, chat conversations can become extensive. The email client program 58 statically or dynamically allocates sufficient memory to the Subject line 52 of the mChat message 14 to support the length of the mChat conversation. When each previous chat message (hereafter, chat entry) is preserved, the sequence of chat entries appears in the Subject line 52 in a Last-In-First-Out (LIFO) order (i.e., in a reverse temporal order). The email client program 58 preferably provides formatting for the sequence of chat entries that delineates between chat entries in the Subject line 52. Optionally, the email client program 58 "signs" each entry of the mChat message with the identity of the author.

The particular formatting implemented by the email client program 58 to delineate between chat entries can vary without departing from the principles of the invention. In one embodiment, the email client program 58 adds a reply delimiter "RE:" before the immediately previous chat entry. An example using the reply delimiter to delineate between chat entries is illustrated by the text immediately below representing the Subject line contents of an mChat message. For a temporal reading of the mChat conversion below, chat entries are read from bottom to top. The most recent chat entry appears as the first line of text (or the top line) in the Subject line 52. Note that the following example also uses carriage returns to delineate between chat entries so that each chat entry appears on a new line on a display. In one embodiment, the email client program 58 automatically embeds a carriage return after each chat entry to achieve this display formatting. In another embodiment, the mChat conversation appears on a single line, and the only delineation between chat entries are the reply delimiters. The Subject line 52 for one exemplary mChat conversation comprised of 5 mChat messages reads as follows:

I've set up the meeting for Tuesday at LOAM. Let me know if this is acceptable. <d>
Re: Any time Tuesday or Wednesday.—S.
Re: How about next week? <d>
Re: If you are talking about this week, then Thursday at 2 PM is my only possibility.—S.
Re: I am attempting to schedule a meeting to discuss the status of the project. Please send me your availability. Thanks, <d>

As another example, carets (>), instead of reply delimiters, are used to delineate between chat entries. Illustrating this example with the same mChat conversation of the previous example, the email client program 58 adds another caret to each existing chat entry already in the message when a new chat entry is added to the mChat conversation. The Subject line 52 reads as follows:

I've set up the meeting for Tuesday at LOAM. Let me know if this is acceptable. <m>
>Any time Tuesday or Wednesday.—S.
>>How about next week? <m>
>>>If you are talking about this week, then Thursday at 2 PM is my only possibility.—S.
>>>>I am attempting to schedule a meeting to discuss the status of the project. Please send me your availability. Thanks, <m>

The preceding examples illustrate two of many techniques possible for delineating between chat entries. Other techniques include appending or prepending the identity of the author to the chat entry, numbering the entries, and inserting other special characters, visible or invisible (e.g., carriage return and new line). Another embodiment is to use no delimiters; this technique can rely on the reader to discern between chat entries.

Like conventional email messages, the email client program 50 displays mChat messages in a graphical mailbox view listing each email message in the mailbox. Each mChat message appears in the list as a single line item in the mailbox view (specifically, in the "inbox" folder of the mailbox for a new mChat message). FIG. 4 shows an example embodiment of a mailbox view 100 displayed to the user listing those emails currently located in the user's inbox. Above the list of emails are column headings for identifying the sender 104, the date 108, the subject 112, and the memory size 116 for each email message. The email client program 58 displays a default number of characters of the Subject line 52. The user can change this default number, but the maximum width of the subject column 112 remains limited by the number of characters and other columns in a line item. MChat messages are identified by a particular icon or other identifier that appears in the same line item as that mChat message. Here, the identifier is "<>", which appears before the subject line of each mChat message.

To read the contents of an mChat message, the user positions the cursor 120 over the subject field of the mChat message. In one embodiment, this "mouse-over" operation causes the contents of the Subject line 52 of the mChat message to be displayed in its entirety as, for example, a drop-down list 124 with the most recent chat entry on the top line of the list 124 and the history of previous chat entries appearing below the most recent chat entry. Depending upon the length of the mChat conversation, the contents of the Subject line covers the mChat message being read and possibly one or more of the other email messages in the view immediately below. Thus, the user reads the mChat conversation in its entirety while in the inbox view, without having to open the mChat message. (Double-clicking on the mChat message using the graphical input device (e.g., mouse), as is done regularly to open a conventional email message, in one embodiment produces no response for an mChat message. Another embodiment responds to the double-click operation by displaying the drop-down list 124.)

In another embodiment, shown in FIG. 5, the mouse-over operation causes scrolling arrows 150-1, 150-2 (generally, 150) to appear at each end of the subject column 112 of that mChat message. By positioning the cursor 120 over the left or right arrow 150, the user horizontally scrolls left or right, respectively, through the contents 124' in the Subject line 52 of the mChat message. In another embodiment, the user drags the text in the subject column 112 with the cursor 120 to scroll horizontally through the contents 124' in the left or right direction. In these embodiments, the number of characters that can be read at one time is limited to the width of the subject column 112, but reading the mChat message does not occlude any other messages in the mailbox view.

Some devices for reading email, such as personal digital assistants or PDAs, do not have a cursor that can be graphically positioned over an mChat message line item. For such computing devices, the user employs the particular technique of the particular device for selecting an email message. Referring to PDAs, for example, the user positions a stylus over the mChat message line item in the mailbox view and with it presses the screen display. In another embodiment, the user moves the current "focus" of the device to the desired mChat message, and waits; after a brief interval (typically a half-second), the device begins to scroll the contents of the mChat message that is the current focus.

In one embodiment, the email client program 58 generates an alert event when an mChat message is received. For example, the alert can include a graphical window appearing on the user's graphical user interface, the window having conventional chat-like features. A message accompanying this window can indicate that the sending party may not be online, and thus unavailable to engage in chat. The email client program 58 produces this alert directly or invokes the chat client program 60 to produce it.

Figure 6:
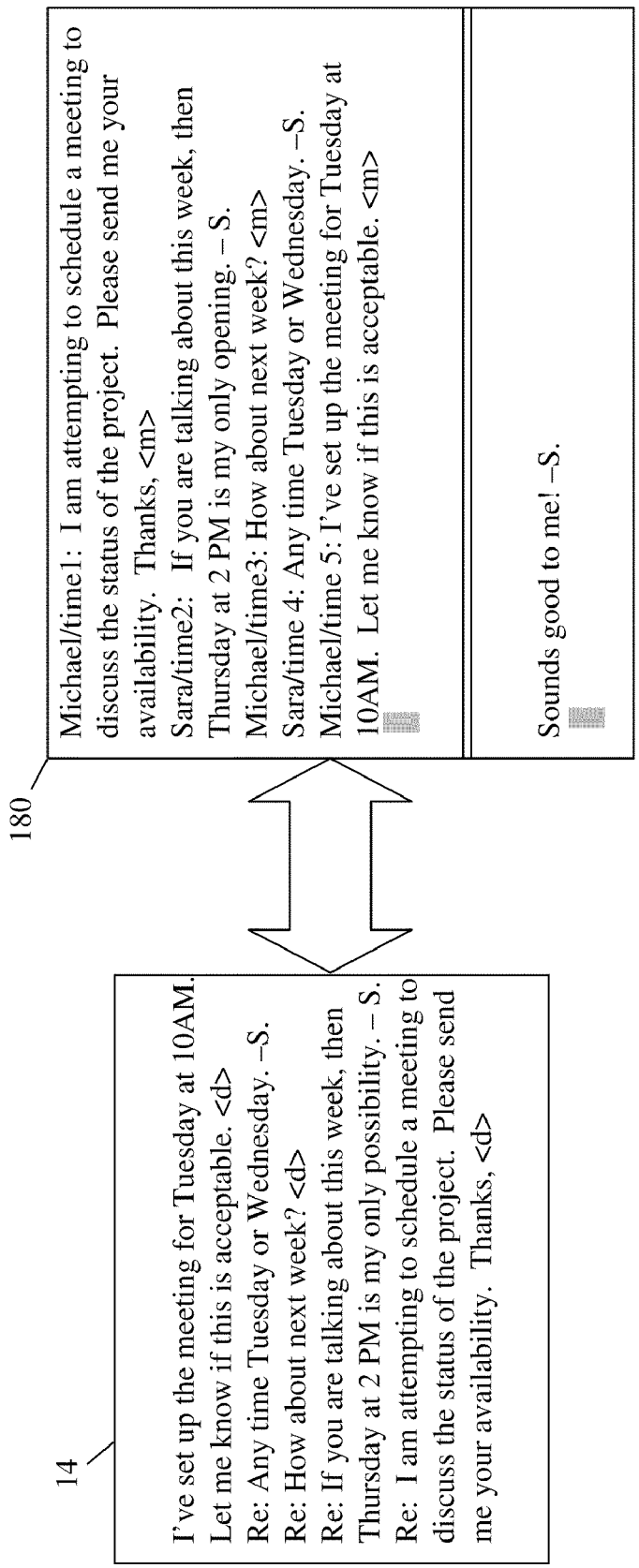
FIG. 6 is a diagram illustrating an example of converting between mChat message and chat conversation formats.

FIG. 6 shows an example of two-way conversions between mChat message and chat conversation formats. If a user so chooses, he can convert an asynchronous mChat message 14 into a synchronous chat 180, or a synchronous chat 180 into an asynchronous mChat message 14. For an asynchronous to the synchronous format conversion, upon the user's specific command, e.g., by clicking a graphical button or selecting an item in a pull down menu while the mChat message 14 is selected, the email client program 58 launches the chat client program 60, reformats the contents of the Subject line 52 of the mChat message 14 into a chat format (e.g., by reordering the chat entries so that first chat entry in the list becomes the last and the last chat entry becomes the first and by inserting the author's name in front of each particular chat entry), and pastes the reformatted Subject line 52 contents into the chat window 180. The chat window 180 then appears on the display screen of each chat participant. Provided each participant is online, they can resume their communications synchronously.

Conversely, if the participants currently engaged in a synchronous free-form chat want to continue their conversation asynchronously, either participant can cause the full contents of the chat to be converted into an mChat message. In this event, the chat server converts the contents of the chat conversation into the format of an mChat message (i.e., reversing the order of chat entries and inserting delimiters as described above), and pastes it into the Subject line 52 of the mChat message 14. Optionally, the attribution associated with each chat entry in the chat conversation can be removed when converting from the chat format to the mChat message format. The mChat message 14 is then electronically mailed to each chat participant (now to become mChat participants). In another embodiment, the email server 74 sends the mChat message to the mChat participants.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

The invention claimed is:

1. A computer program product for communicating with a user of a processor-based device over a network, the computer program product comprising:
   a non-transitory computer readable storage medium having computer readable program code embodied therewith, the computer readable program code comprising:
   computer readable program code configured to convert a synchronous electronic communication into a body-less electronic mail message having a subject line and lacking a message body capable of receiving message content; and
   computer readable program code configured to place, in response to converting the synchronous electronic communication into a body-less electronic mail message, each text message of the synchronous communication into the subject line of the body-less electronic mail message.

2. The computer program product of claim 1, further comprising computer readable program code configured to convert, in response to a command from a user, a received body-less electronic mail message into a synchronous electronic communication and to initiate synchronous communications with a sender of the received body-less electronic mail message.

3. The computer program product of claim 2, further comprising computer readable program code configured to present an option to the user to choose between replying to the received body-less electronic mail message with an electronic mail message having a message body or with a body-less electronic mail message lacking a message body.

4. The computer program product of claim 1, further comprising computer readable program code configured to present an option to a user, in response to a command to generate a new electronic mail message, to choose between generating a body-less electronic mail message and generating an electronic mail message with a message body.

5. The computer program product of claim 1, further comprising computer readable program code configured to display a given body-less electronic mail message on a display screen as a line item in a mailbox view and an indicator with the line item to identify the line item as a body-less electronic mail message.

6. A computer program product for communicating with a user of a processor-based device over a network, the computer program product comprising:
   a non-transitory computer readable storage medium having computer readable program code embodied therewith, the computer readable program code comprising:
   computer readable program code configured to convert a received synchronous electronic communication into a body-less electronic mail message having a subject line and lacking a message body capable of receiving message content,
   computer readable program code configured to place each text message of the received synchronous electronic communication into the subject line of the body-less electronic mail message when converting the received synchronous electronic communication into the body-less electronic mail message; and
   computer readable program code configured to convert a received body-less electronic mail message into a synchronous electronic communication.

7. The computer program product of claim 6, further comprising computer readable program code configured to present an option to a user to choose between replying to the received body-less electronic mail message with an electronic mail message having a message body or with a body-less electronic mail message lacking a message body.

8. The computer program product of claim 6, further comprising computer readable program code configured to present an option to a user, in response to a command to generate a new electronic mail message, to choose between generating a body-less electronic mail message and generating an electronic mail message with a message body.

9. The computer program product of claim 6, further comprising computer readable program code configured to display the received body-less electronic mail message on a display screen as a line item in a mailbox view and an indicator with the line item to identify the line item as a body-less electronic mail message.

10. A computing system comprising:
    a processor executing computer readable program code configured to convert a synchronous electronic communication into a body-less electronic mail message having a subject line and lacking a message body capable of receiving message content,
    the processor placing, in response to converting the synchronous electronic communication into the body-less electronic mail message, each text message of the synchronous communication into the subject line of the body-less electronic mail message.

11. The system of claim 10, wherein the processor executes computer readable program code configured to convert, in response to a command from a user, a received body-less electronic mail message into a synchronous electronic communication.

12. The system of claim 11, wherein the processor executes computer readable program code configured to present an option to a user to choose between replying to the received body-less electronic mail message with an electronic mail message having a message body or with a body-less electronic mail message lacking a message body.

13. The system of claim 11, wherein the processor executes computer readable program code configured to initiate synchronous communications with a sender of the received body-less electronic mail message after converting the received body-less electronic mail message into a synchronous communication.

14. The system of claim 10, wherein the processor executes computer readable program code configured to present an option to a user, in response to a command to generate a new electronic mail message, to choose between generating a body-less electronic mail message and generating an electronic mail message with a message body.

15. The system of claim 10, wherein the processor executes computer readable program code configured to display a given body-less electronic mail message on a display screen as a line item in a mailbox view and an indicator with the line item to identify the line item as a body-less electronic mail message.

16. A method of communicating with a user of a processor-based device over a network, the method comprising:
   converting a synchronous communication into a body-less electronic mail message having a subject line and lacking a message body capable of receiving message content; and
   placing, in response to converting the synchronous communication, each text message of the synchronous communication into the subject line of the body-less electronic mail message.

17. The method of claim 16, further comprising converting, in response to a command from the user, the body-less electronic mail message into a synchronous electronic communication.

18. The method of claim 16, further comprising presenting an option to a user to choose between replying to a received body-less electronic mail message with an electronic mail message having a message body or with a body-less electronic mail message lacking a message body.

19. The method of claim 16, further comprising presenting an option to a user, in response to a command to generate a new electronic mail message, to choose between generating a body-less electronic mail message and generating an electronic mail message with a message body.

20. The method of claim 16, further comprising displaying a given body-less electronic mail message on a display screen as a line item in a mailbox view and an indicator with the line item to identify the line item as a body-less electronic mail message.

* * * * *